(12) United States Patent
Mishra et al.

(10) Patent No.: US 12,190,127 B2
(45) Date of Patent: Jan. 7, 2025

(54) MULTI-LEVEL CONSOLE INTERFACE FOR COMPUTING DEVICES

(71) Applicant: Dell Products L.P., Round Rock, TX (US)

(72) Inventors: Abhishek Mishra, Bangalore (IN); Vivek Bhargava, Bangalore (IN); Vaideeswaran Ganesan, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 205 days.

(21) Appl. No.: 18/114,470

(22) Filed: Feb. 27, 2023

(65) Prior Publication Data

US 2024/0289142 A1    Aug. 29, 2024

(51) Int. Cl.
*G06F 9/44* (2018.01)
*G06F 9/445* (2018.01)

(52) U.S. Cl.
CPC .................................. *G06F 9/4451* (2013.01)

(58) Field of Classification Search
CPC ..................................... G06F 1/32; G06F 1/01
See application file for complete search history.

(56) References Cited

U.S. PATENT DOCUMENTS

2009/0328169 A1* 12/2009 Hutchison ............... H04L 63/04
                                                        707/999.01
2015/0112647 A1*  4/2015 Currin ..................... H04L 67/10
                                                        703/1

OTHER PUBLICATIONS

Dell EMC, "Complete Agent-Free Management of Poweredge Servers," Specification Sheet v.1, Apr. 6, 2017, 6 pages.
Dell EMC, "Integrated Dell Remote Access Controller 9, User's Guide," Rev. A02, Dec. 2020, 363 pages.
K. Seaborn et al., "Gamification in Theory and Action: A Survey," International Journal of Human-Computer Studies, vol. 74, Feb. 2015, pp. 14-31.

* cited by examiner

*Primary Examiner* — Keshab R Pandey
(74) *Attorney, Agent, or Firm* — Ryan, Mason & Lewis, LLP

(57) ABSTRACT

An apparatus comprises a processing device configured to detect a user login to access a console of a computing device implementing a multi-level console interface comprising two or more levels each associated with a set of criteria, goals to be achieved, and actions relevant for achieving the goals. The processing device is also configured to determine a current state of the computing device, and to select a given level of the multi-level console interface based at least in part on mapping the current state to a given set of criteria associated with the given level. The processing device is further configured to provide, via the console of the computing device, an interface screen corresponding to the given level, the interface screen displaying the actions relevant for achieving the goals of the given level to facilitate transitioning of the computing device from the current state to a desired state.

20 Claims, 16 Drawing Sheets

| LEVEL | CRITERIA | GOAL | IMPACTED SUBSYSTEM(S) | TASKS |
|---|---|---|---|---|
| L1 - SYSTEM IN UNINITIALIZED OR CORRUPTED STATE | OS NOT INSTALLED; SYSTEM RESTORE IN PROGRESS; OS HAS CRASHED; SYSTEM/CONTROLLER STATE IS CORRUPTED | BRING SYSTEM TO USEFUL STATE | OS SUBSYSTEM; TECHNICAL SUPPORT REPORT (TSR) SUBSYSTEM | VIEW OS LOGS; VIEW RESTORE PROGRESS; VIEW LAST TSR |
| L2 - SECURITY UPDATE AVAILABLE | AUTO UPDATE SOURCE HAS AN URGENT UPDATE WITH FLAGGED SECURITY VULNERABILITY | BRING SYSTEM TO SECURE STATE | AUTO UPDATE; UPDATE | FIRMWARE UPDATE |
| L3 - SYSTEM NEEDS ATTENTION | ONE OR MORE REQUIRED COMPONENTS IN SYSTEM IS IN CRITICAL STATE | BRING SYSTEM TO RISK-FREE STATE | SUBSYSTEMS IN CRITICAL/ WARNING STATE | VIEW SUBSYSTEM LOGS; VIEW STATE; VIEW INVENTORY; FIX COMMANDS |
| L4 - SYSTEM DEVIATED FROM DESIRED STATE SIGNIFICANTLY | SYSTEM DEVIATES FROM DESIRED STATE CONFIGURATION (E.G., A CONFIGURATION STATE CREATED IN A MANAGEMENT CONSOLE LIKE OPENMANAGE ENTERPRISE (OME) THAT MONITORS CONFIGURATION DRIFT) | BRING SYSTEM TO DESIRED STATE | CHANGED ELEMENTS | COMMANDS TO OBSERVE, TEST, CHANGE, AND RESTORE STATE; COMMANDS TO MAKE CURRENT STATE CONFIGURATION THE DESIRED STATE CONFIGURATION |
| L5 - SYSTEM IN DESIRED STATE BUT IS STRESSED | SYSTEM IS IN DESIRED STATE BUT SEEMS STRESSED OUT (WATCH) | BRING SYSTEM INTO STRESS-FREE DESIRED STATE | ALL | DASHBOARDS; CHARTS PROVIDING THE ACTUAL AREAS OF STRESS; LOGS |
| L6 - SYSTEM IN DESIRED STATE | SYSTEM IS IN DESIRED STATE WITH OPTIMAL PERFORMANCE | KEEP SYSTEM IN THE SAME STATE | ALL | DASHBOARDS; CHARTS; LOGS; MORE OPTIMIZING STEPS |

| CRITERIA NAME | SCRIPT |
|---|---|
| OS NOT INSTALLED | COMMON INFORMATION MODEL (CIM) SYSTEMVIEW.OPERATINGSYSTEM = NOT INSTALLED, LISTEN TO EVENT: OS HAS STARTED |
| SYSTEM RESTORE IN PROGRESS | USER INITIATED A SYSTEM RESTORE TASK, CIM_JOB CONTAINS A JOB SYSTEM RESTORE AND THE STATUS OF THAT JOB IS IN PROGRESS |
| OS HAS CRASHED | OS WATCH DOG HAS NOT BE RESET, LISTEN TO EVENT: THE WATCH DOG TIMER EXPIRED EVENT IS TRIGGERED |
| SYSTEM STATE IS CORRUPTED | COLLECT SYSTEM INVENTORY ON RESTART (CSIOR) IS NOT IN GOOD SHAPE |

705

| GOAL NAME | SCRIPT |
|---|---|
| OS INSTALLED | COMMON INFORMATION MODEL (CIM) SYSTEMVIEW.OPERATINGSYSTEM = INSTALLED, LISTEN TO EVENT: OS HAS STARTED |
| NO SYSTEM RESTORE IN PROGRESS | NO JOB SYSTEM RESTORE JOB PRESENT IN THE SYSTEM |
| SYSTEM STATE IS OK | COLLECT SYSTEM INVENTORY ON RESTART (CSIOR) RETURNS SUCCESS |

FIG. 7

| CRITERIA NAME | SCRIPT |
|---|---|
| URGENT SECURITY UPDATED ON ENTERPRISE ONLINE FILE TRANSFER PROTOCOL (FTP) SERVER | CHECK "FTP.ENTERPRISE.COM" CATALOGS FOR ANY URGENT UPDATES; CHECK IF THERE IS ANY SECURITY VULNERABILITIES FIXED IN THOSE UPDATES |

| GOAL NAME | SCRIPT |
|---|---|
| SYSTEM IS SECURE | NO OUTSTANDING SECURITY UPDATES ON "FTP.ENTERPRISE.COM" |

FIG. 8

| CRITERIA NAME | SCRIPT |
|---|---|
| AT LEAST ONE COMPONENT IS IN A WARNING OR CRITICAL STATE | FIND LIST OF ALL PHYSICAL AND LOGICAL COMPONENTS WHICH ARE NOT HEALTHY |

900

| GOAL NAME | SCRIPT |
|---|---|
| SYSTEM IS RESTORED TO FULL HEALTH | ENSURE THAT ALL COMPONENTS ARE HEALTHY |

MULTI-LEVEL CONSOLE INTERFACE FOR COMPUTING DEVICES

FIELD

The field relates generally to information processing, and more particularly to management of information processing systems.

BACKGROUND

Computing devices may be configured with consoles that may be accessed locally or remotely by authorized users. A console may present an interface, such as a graphical user interface, which can show various information about an associated computing device through a standard set of dashboards and menus. Generally, users may navigate the dashboards and menus to drill down to the information needed to perform different tasks. A typical console interface is static in nature, such that each time a user logs into a console its associated console interface will present the same set of information through the standard set of dashboards and menus.

SUMMARY

Illustrative embodiments of the present disclosure provide techniques for generating multi-level console interfaces for computing devices.

In one embodiment, an apparatus comprises at least one processing device comprising a processor coupled to a memory. The at least one processing device is configured to detect a user login to access a console of a computing device, the console implementing a multi-level console interface comprising two or more levels, each of the two or more levels being associated with a set of criteria, one or more goals to be achieved, and one or more actions relevant for achieving the one or more goals. The at least one processing device is also configured to determine a current state of the computing device, and to select a given level of the multi-level console interface, the given level of the multi-level console interface being selected based at least in part on mapping the current state of the computing device to a given set of criteria associated with the given level of the multi-level console interface. The at least one processing device is further configured to provide, via the console of the computing device, an interface screen corresponding to the given level of the multi-level console interface, the interface screen displaying the one or more actions relevant for achieving the one or more goals of the given level of the multi-level console interface to facilitate transitioning of the computing device from the current state to a desired state.

These and other illustrative embodiments include, without limitation, methods, apparatus, networks, systems and processor-readable storage media.

BRIEF DESCRIPTION OF THE DRAWINGS

FIG. 6 shows a table of different levels of a multi-level console interface for a computing device in an illustrative embodiment.

FIG. 7 shows tables of criteria and a goal set for a first level of a multi-level console interface for a computing device in an illustrative embodiment.

FIG. 8 shows tables of criteria and a goal set for a second level of a multi-level console interface for a computing device in an illustrative embodiment.

FIG. 9 shows tables of criteria and a goal set for a third level of a multi-level console interface for a computing device in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
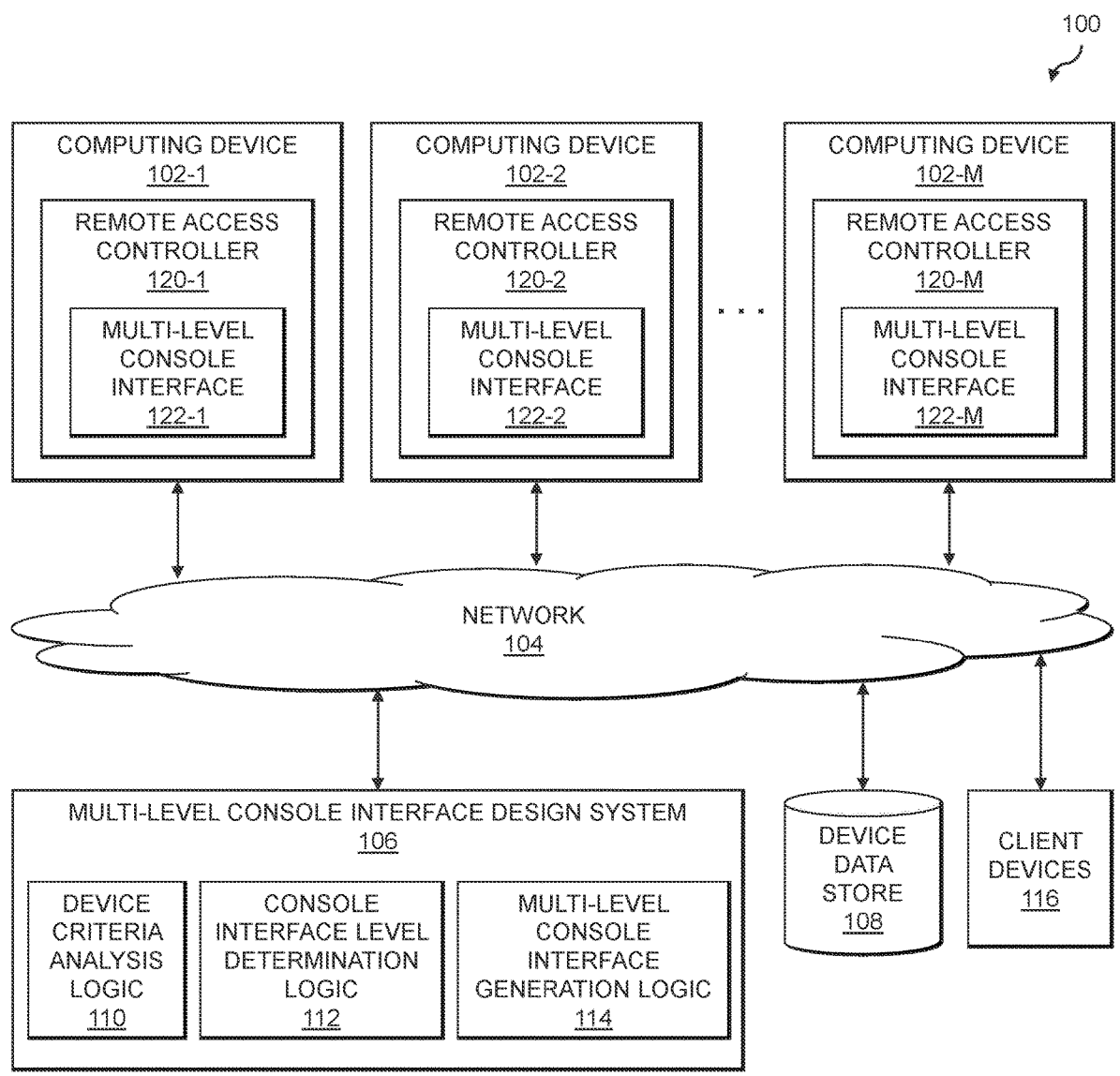
FIG. 1 is a block diagram of an information processing system configured for generating multi-level console interfaces for computing devices in an illustrative embodiment.

FIG. 1 shows an information processing system 100 configured in accordance with an illustrative embodiment. The information processing system 100 is assumed to be built on at least one processing platform and provides functionality for generating tiered or multi-level console interfaces for computing devices. Computing devices are configured with consoles, also referred to as a system consoles, which may be used for management of different aspects of the computing devices. In some cases, the console is remotely accessible (e.g., over a network), and may provide a text or graphical terminal for performing various actions on the computing devices. The information processing system 100 includes a set of computing devices 102-1, 102-2, . . . 102-M (collectively, computing devices 102) which are coupled to a network 104. Also coupled to the network 104 is a multi-level console interface design system 106 and a device data store 108. The computing devices 102 may comprise information technology (IT) assets of an IT infrastructure, and are assumed to comprise physical and/or virtual computing resources in the IT infrastructure. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

The computing devices 102 are configured to implement respective remote access controllers 120-1, 120-2, . . . 120-M (collectively, remote access controllers 120) implementing multi-level console interfaces 122-1, 122-2, . . . 122-M (collectively, multi-level console interfaces 122). The remote access controllers 120 may be implemented as respective instances of an Integrated Dell Remote Access Controller (iDRAC) providing secure local and remote management of the computing devices 102, enabling IT administrators to deploy, update and monitor the computing devices 102.

The multi-level console interface design system 106 is configured to utilize various information stored in the device data store 108 to design the multi-level console interfaces 122 used for the remote access controllers 120 of the computing devices 102. The device data store 108 may store, for example, information regarding various subsystems which are part of the computing devices 102 as well as configuration information for the computing devices 102 (e.g., installed operating system (OS) information, basic input-output system (BIOS) information, hardware and software components, etc.). Such information is used by the multi-level console interface design system 106 in order to design and build the multi-level console interfaces 122 used by the remote access controllers 120.

In some embodiments, the multi-level console interface design system 106 is used for an enterprise system. For example, an enterprise may subscribe to or otherwise utilize the multi-level console interface design system 106 for generating the multi-level console interfaces 122 for the computing devices 102 operated by users of the enterprise. As used herein, the term "enterprise system" is intended to be construed broadly to include any group of systems or other computing devices. For example, the computing devices 102 may provide a portion of one or more enterprise systems. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities).

The computing devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The computing devices 102 may also or alternately comprise virtualized computing resources, such as VMs, containers, etc.

The computing devices 102 in some embodiments comprise respective computers associated with a particular company, organization or other enterprise. Thus, the computing devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The device data store 108, as discussed above, is configured to store and record various information that is used by the multi-level console interface design system 106 in designing the multi-level console interfaces 122 of the remote access controllers 120 of the computing devices 102. The device data store 108 in some embodiments is implemented using one or more storage systems or devices associated with the multi-level console interface design system 106. In some embodiments, one or more of the storage systems utilized to implement the device data store 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the multi-level console interface design system 106, as well as to support communication between the multi-level console interface design system 106 and other related systems and devices not explicitly shown.

One or more client devices 116 may be configured to access or otherwise utilize the multi-level console interfaces 122 of the remote access controllers 120 of the computing devices 102. In some embodiments, the client devices 116 are assumed to be associated with system administrators, IT managers or other authorized personnel responsible for managing the computing devices 102. For example, a given one of the client devices 116 may be operated by a user to access a graphical user interface (GUI) provided by the multi-level console interfaces 122. The multi-level console interface design system 106 may be provided as a cloud service that is accessible by the given client device 116 to allow the user thereof to manage generation and design of the multi-level console interfaces 122. In some embodiments, the computing devices 102 are owned or operated by the same enterprise that operates the multi-level console interface design system 106 (e.g., where an enterprise such as a business provides support for the assets it operates). In other embodiments, the computing devices 102 may be owned or operated by one or more enterprises different than the enterprise which operates the multi-level console interface design system 106 (e.g., a first enterprise provides support for assets that are owned by multiple different customers, business, etc.). Various other examples are possible.

In some embodiments, the client devices 116 may implement host agents that are configured for automated transmission of information to and from the remote access controllers 120 of the computing devices 102 and/or the multi-level console interface design system 106. It should be noted that a "host agent" as this term is generally used herein may comprise an automated entity, such as a software entity running on a processing device. Accordingly, a host agent need not be a human entity.

The multi-level console interface design system 106 in the FIG. 1 embodiment is assumed to be implemented using at least one processing device. Each such processing device generally comprises at least one processor and an associated memory, and implements one or more functional modules or logic for controlling certain features of the multi-level console interface design system 106. In the FIG. 1 embodiment, the multi-level console interface design system 106 comprises device criteria analysis logic 110, console interface level determination logic 112, and multi-level console interface generation logic 114. The device criteria analysis logic 110 is configured, for a given one of the computing devices 102 (e.g., computing device 102-1), to obtain current state information (e.g., from the device data store 108, directly from the computing device 102-1) and to determine a set of applicable levels to use for the multi-level console interface 122-1 of the remote access controller 120-1 of the computing device 102-1. The device criteria analysis logic 110 is also configured to determine, based on the current state, one or more impacted components and prioritized tasks. The applicable levels are utilized by the console interface level determination logic 112 to determine a tiered or multi-level structure to utilize for the computing device 102-1. The multi-level console interface generation logic 114 utilizes the impacted components and prioritized tasks' information to generate the multi-level console interface 122-1. This may include determining which interface screen and associated tools to show for the lower applicable level of the multi-level console interface 122-1 (e.g., the lowest level where issues are encountered), as well as providing interface features for switching between applicable levels.

It is to be appreciated that the particular arrangement of the computing devices 102, the multi-level console interface design system 106, the device data store 108 and the client devices 116 illustrated in the FIG. 1 embodiment is presented by way of example only, and alternative arrangements can be used in other embodiments. As discussed above, for example, the multi-level console interface design system 106 (or portions of components thereof, such as one or more of the device criteria analysis logic 110, the console interface level determination logic 112 and the multi-level console interface generation logic 114) may in some embodiments be implemented internal to one or more of the computing devices 102 and/or the client devices 116.

At least portions of the device criteria analysis logic 110, the console interface level determination logic 112 and the multi-level console interface generation logic 114 may be implemented at least in part in the form of software that is stored in memory and executed by a processor.

The multi-level console interface design system 106 and other portions of the information processing system 100, as will be described in further detail below, may be part of cloud infrastructure.

The multi-level console interface design system 106 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The computing devices 102, the multi-level console interface design system 106, the device data store 108 and the client devices 116, or components thereof, may be implemented on respective distinct processing platforms, although numerous other arrangements are possible. For example, in some embodiments at least portions of the multi-level console interface design system 106 and one or more of the computing devices 102, the device data store 108 and/or the client devices 116 are implemented on the same processing platform. A given computing device (e.g., 102-1) can therefore be implemented at least in part within at least one processing platform that implements at least a portion of the multi-level console interface design system 106.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the computing devices 102, the multi-level console interface design system 106, the device data store 108 and the client devices 116, or portions or components thereof, to reside in different data centers. Numerous other distributed implementations are possible. The multi-level console interface design system 106 can also be implemented in a distributed manner across multiple data centers.

Additional examples of processing platforms utilized to implement the multi-level console interface design system 106 and other components of the information processing system 100 in illustrative embodiments will be described in more detail below in conjunction with FIGS. 15 and 16.

It is to be appreciated that these and other features of illustrative embodiments are presented by way of example only, and should not be construed as limiting in any way.

It is to be understood that the particular set of elements shown in FIG. 1 for generating the multi-level console interfaces 122 of the remote access controllers 120 of the computing devices 102 is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for generating multi-level console interfaces for computing devices will now be described in more detail with reference to the flow diagram of FIG. 2. It is to be understood that this particular process is only an example, and that additional or alternative processes for generating multi-level console interfaces for computing devices may be used in other embodiments.

In this embodiment, the process includes steps 200 through 206. These steps are assumed to be performed by the remote access controllers 120 of the computing devices 102 utilizing the multi-level console interfaces 122, and/or by the multi-level console interface design system 106 utilizing the device criteria analysis logic 110, the console interface level determination logic 112 and the multi-level console interface generation logic 114. The process begins with step 200, detecting a user login to access a console (e.g., remote access controller 120-1) of a computing device (e.g., computing device 102-1), the console implementing a multi-level console interface (e.g., multi-level console interfaces 122-1) comprising two or more levels. Each of the two or more levels is associated with a set of criteria, one or more goals to be achieved, and one or more actions relevant for achieving the one or more goals. The console of the computing device may comprise a remote access controller permitting remote network-based access to the console of the computing device.

In step 202, a current state of the computing device is determined. Step 202 may include performing a sentiment analysis of messages from one or more message catalogs of the computing device to determine knowledge-aware sentiment keywords mapped to the set of criteria for different ones of the two or more levels.

A given level of the multi-level console interface is selected in step 204, the given level of the multi-level console interface being selected based at least in part on mapping the current state of the computing device to a given set of criteria associated with the given level of the multi-level console interface. The two or more levels of the multi-level console interface may be arranged in a hierarchy of subsystems of the computing device. The one or more goals of each level may comprise advancing the computing device from the current state corresponding to a current level of the hierarchy to another state corresponding to a higher level of the hierarchy. The given level selected in step 204 may comprise a lowest level of the hierarchy having a set of criteria mapped to the current state of the computing device. The hierarchy may comprise a first level corresponding to a basic input-output system of the computing device, a second level corresponding to an operating system of the computing device, and a third level corresponding to an update subsystem of the computing device.

The given level selected in step 204 may correspond to the computing device being in at least one of an uninitialized and a corrupted state, a given set of criteria of the given level comprising at least one of determining that the computing device does not have an operating system installed, determining that a system restore is in progress for the computing device, determining that an operating system of the computing device has crashed, and determining that the computing device is corrupted. The given level selected in step 204 may alternatively correspond to the computing device having one or more security updates available, a given set of criteria of the given level comprising determining that one or more update sources have one or more updates with at least a designated threshold urgency. The given level selected in step 204 may alternatively correspond to the computing device needing attention, a given set of criteria of the given level comprising determining that one or more components of the computing device is in a critical state. The given level selected in step 204 may alternatively comprise one of: a first level corresponding to the computing device deviating from the desired state, a first set of criteria of the first level comprising determining that a configuration state of the computing device deviates at least a designated threshold amount from the desired state; a second level corresponding to the computing device being in the desired state but stressed, a second set of criteria of the second level comprising determining that performance metrics for one or more components of the computing device are outside a designated performance range; and a third level corresponding to the computing device being in the desired state and unstressed, a third set of criteria of the third level comprising determining that the performance metrics for the one or more components of the computing device are within the designated performance range.

In step 206, an interface screen corresponding to the given level of the multi-level console interface is provided via the console of the computing device. The interface screen displays the one or more actions relevant for achieving the one or more goals of the given level of the multi-level console interface to facilitate transitioning of the computing device from the current state to a desired state. In some embodiments, step 206 includes determining one or more upcoming scheduled tasks for the user logged in to the console of the computing device, determining a time required for performing the one or more actions of the given level of the multi-level console interface, and displaying a subset of the one or more actions of the given level of the multi-level console interface which are able to be completed prior to the one or more upcoming scheduled tasks for the user logged in to the console of the computing device.

Figure 2:
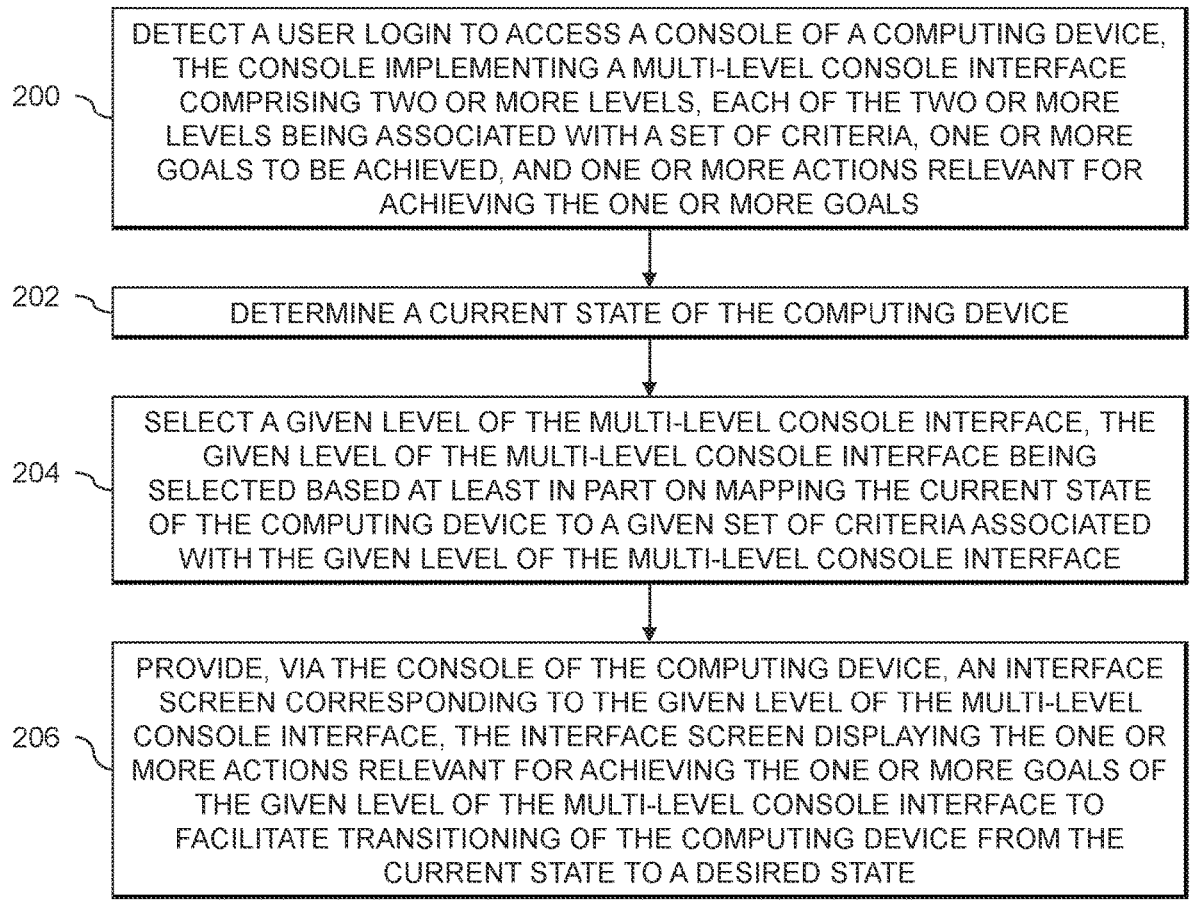
FIG. 2 is a flow diagram of an exemplary process for generating multi-level console interfaces for computing devices in an illustrative embodiment.

The FIG. 2 process may further include building the multi-level console interface by utilizing a state machine builder to scan and extract information from two or more subsystems of the computing device and to assign respective ones of the two or more subsystems of the computing device to different ones of the two or more levels. The state machine builder may be configured to generate a dependency tree structure of the two or more subsystems of the computing device, the two or more subsystems comprising a basic input-output system associated with a first one of the two or more levels, an operating system associated with a second one of the two or more levels, and an update subsystem associated with a third one of the two or more levels, the second and third levels having dependencies with the first level, and the third level having a dependency with the second level.

Computing devices may be configured with console interfaces, which can show various information about the computing devices through a standard set of screens. In some cases, the console interface includes one or more dashboards from which drill down is possible. In other cases, the console interface may organize data into multiple framed menus, where a user starts drilling down from the "top" (e.g., overall device aspects) to the "bottom" (e.g., finer details). Users may be familiar with and used to navigating among multiple screens for performing different tasks.

Console interfaces, however, provide a user interface where the screens remain the same irrespective of the current state of the system or computing device. Consider, for example, a server which is bare metal (e.g., no operating system installed), which has a baseboard management controller (BMC) (e.g., iDRAC) that is corrupted, or which has its BMC restoring from a backup (e.g., an OS backup, an iDRAC Import Server Profile). In these and other situations, all the information that is on the standard set of screens of the console interface are not necessarily meaningful or useful. In fact, sometimes the information presented (e.g., system board metrics) is absurd because there is nothing valuable in the system.

Further, console interface screens are more or less fixed, except when certain tasks are enabled or disabled based on user access permissions. Thus, when an IT administrator or other user logs into the console, the screens remain the same irrespective of the potential intent of the IT administrator or other user. The IT administrator or other user has to navigate through a potentially complex maze of menus with complex user interface (UI) controls to reach a screen or other information of interest. In the case where a server or BMC (e.g., iDRAC) needs attention, the presentation of information via the console interface does not reflect that. Instead, the IT administrator or other user has to go through the standard set of screens, UI controls and logs to make a determination. The IT administrator or other user has to interpret through various means, drilling down until reaching the point of failure. In many cases, IT administrators or other users must scrape through logs for figuring out any failure situations and then locate the corresponding UI controls through a maze of menus.

The console experience also forces IT administrators or other users to spend time "finding" tools rather than starting troubleshooting activity or other desired tasks. The experience of "finding" tools is like a user entering a large department store to collect tools and materials before returning to a work site. The "starting" experience is like a surgeon conducting an operation, where all the tools that the surgeon needs are handed down to the surgeon at the instant they are needed.

There are thus various technical problems associated with conventional console interfaces, including that users are presented with a standard set of UI controls to navigate through a maze of menus irrespective of the state of the system or the intent of the user that is accessing the console. This is true even where the presentation of information via the console interface is absurd or useless, or where the elements which need user intervention are embedded inside the maze of menus. Illustrative embodiments provide technical solutions which solve these and other technical problems through determining a current state of a system, and categorizing the system into a set of levels (e.g., of increasing maturity). Each level has an associated interface screen, and the tools required for that state of the system are made available to the user on the level-specific interface screens in the form of clickable menu options or other activatable UI features (e.g., buttons, links, etc.). The user is able to switch between the different levels as needed or desired, and can also revert to a traditional console interface if needed or desired.

In some embodiments, the technical solutions leverage certain features of video gaming techniques. In video gaming, for example, a player starts at the bottom or first level, and gradually progresses to different levels. The levels of a video game are typically numbered increasingly, with subsequent levels having increasing complexity or difficulty. Further, each level of a video game usually has an associated objective. When that objective is met, the player is able to move to the next level. If the objective is not met, the player stays in the same level and can attempt as many times as possible. Video games may also allow players to move between levels, and players are given tools that are required for each level (e.g., power tools or tips as required, possibly through certain shortcuts). In some embodiments, the IT administrator or other user that logs into the remote access controller takes on the role of the "player" with the system or computing device taking on the role of the "video game."

Figure 3:
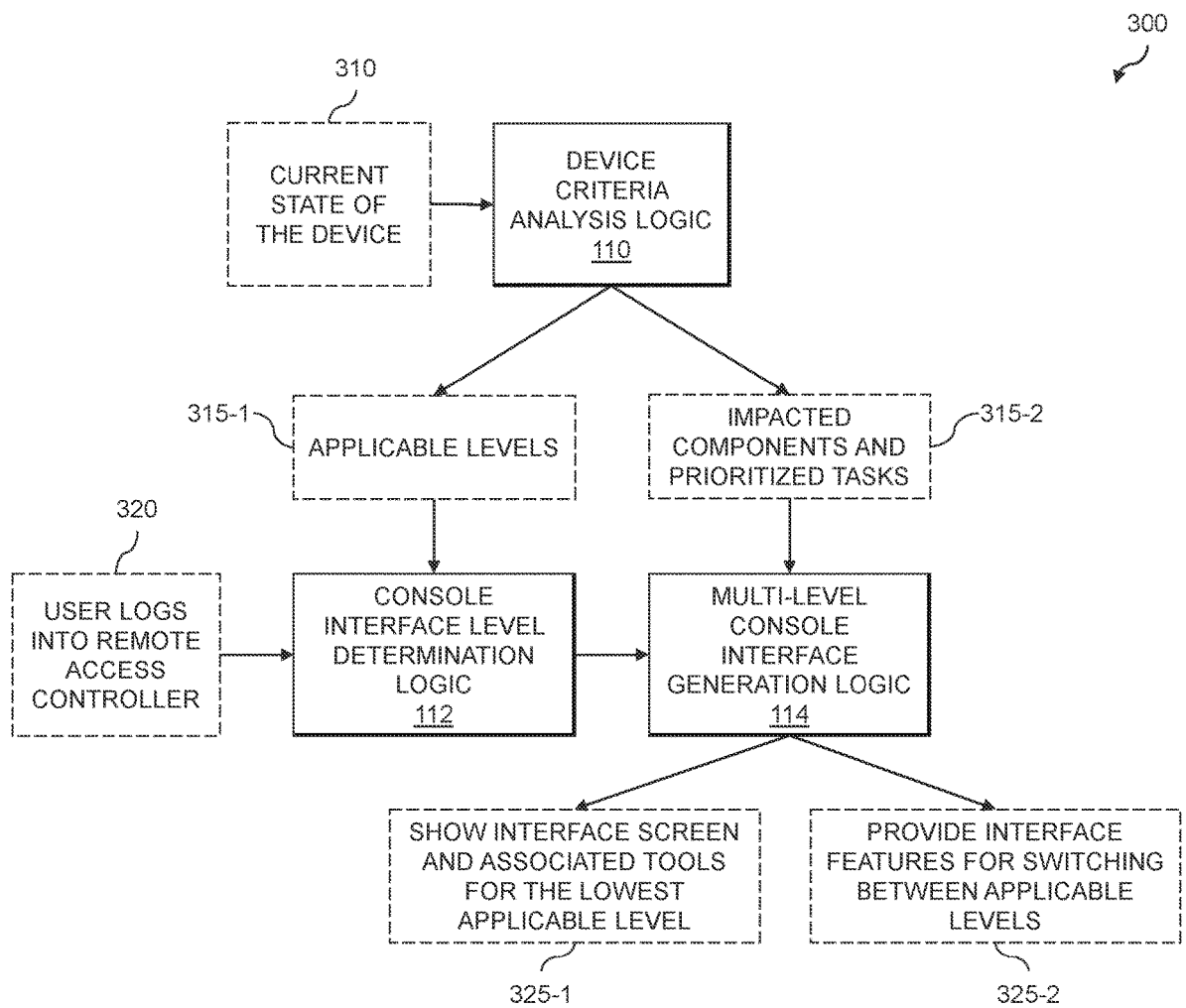
FIG. 3 shows a process flow for designing a multi-level console interface for a computing device in an illustrative embodiment.

FIG. 3 shows an overall system flow 300, where a current state of a system or device 310 is provided to the device criteria analysis logic 110. The device criteria analysis logic 110 then determines a set of applicable levels 315-1 as well as impacted components and prioritized tasks 315-2. When a user logs into a remote access controller 320 of the system of computing device, the console interface level determination logic 112 uses the applicable levels 315-1 to build the multi-level console interface for the computing device and the multi-level console interface generation logic 114 uses the impacted components and prioritized tasks information to generate the multi-level console interface which is presented to the logged in user. This includes showing an interface screen and associated tools for the lowest applicable level 325-1, as well as providing interface features for switching between applicable levels 325-2.

Figure 4:
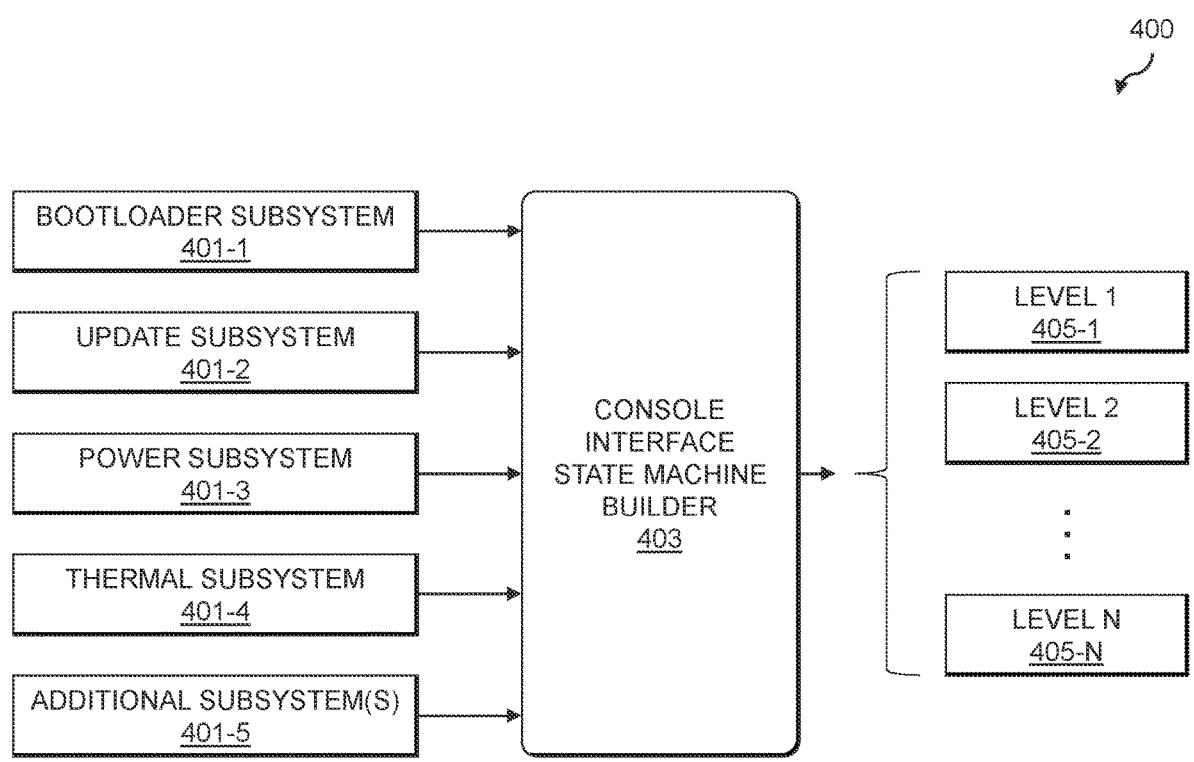
FIG. 4 shows a process flow for building levels of a multi-level console interface for a computing device in an illustrative embodiment.

FIG. 4 shows a system flow 400 for state machine building. A set of subsystems for a system or computing device, including a bootloader subsystem 401-1, an update subsystem 401-2, a power subsystem 401-3, a thermal subsystem 401-4 and one or more additional subsystems 401-5 (collectively, subsystems 401) provide various details to a console interface state machine builder 403 which builds a set of levels 405-1, 405-2, . . . 405-N (collectively, levels 405) for a multi-level console interface. Each of the subsystems 401 will have an interface that provides the list of details for its subsystem to the console interface state machine builder 403. The details may include, for example: subsystem name (e.g., storage); a list of component types (e.g., physical disk, controller, virtual disk, enclosure, etc.); a list of components and their current state (e.g., failing/red, warning/yellow, healthy/green, etc.); a list of all the tools available for the components (e.g., configuration menu options, knowledgebase (KB) articles or links to description pages in user guides, etc.); a component dependency list (e.g., the list of components that are dependent on other subsystems or other components within the same subsystem); etc. All components may be dependent on the BIOS, OS subsystem and update subsystems. OS and update subsystems are themselves dependent on the BIOS subsystem, and the update subsystem is dependent on the OS subsystem. This structure is to ensure that users typically deploy OSes on top of the systems and usually do not apply update/maintenance cycles unless the system is in production. It should be noted that logical subsystems can also be created (e.g., optimal, cluster, etc.). Such logical subsystems should feed in data to the console interface state machine builder 403 so that they can be considered for state changes.

Figure 5:
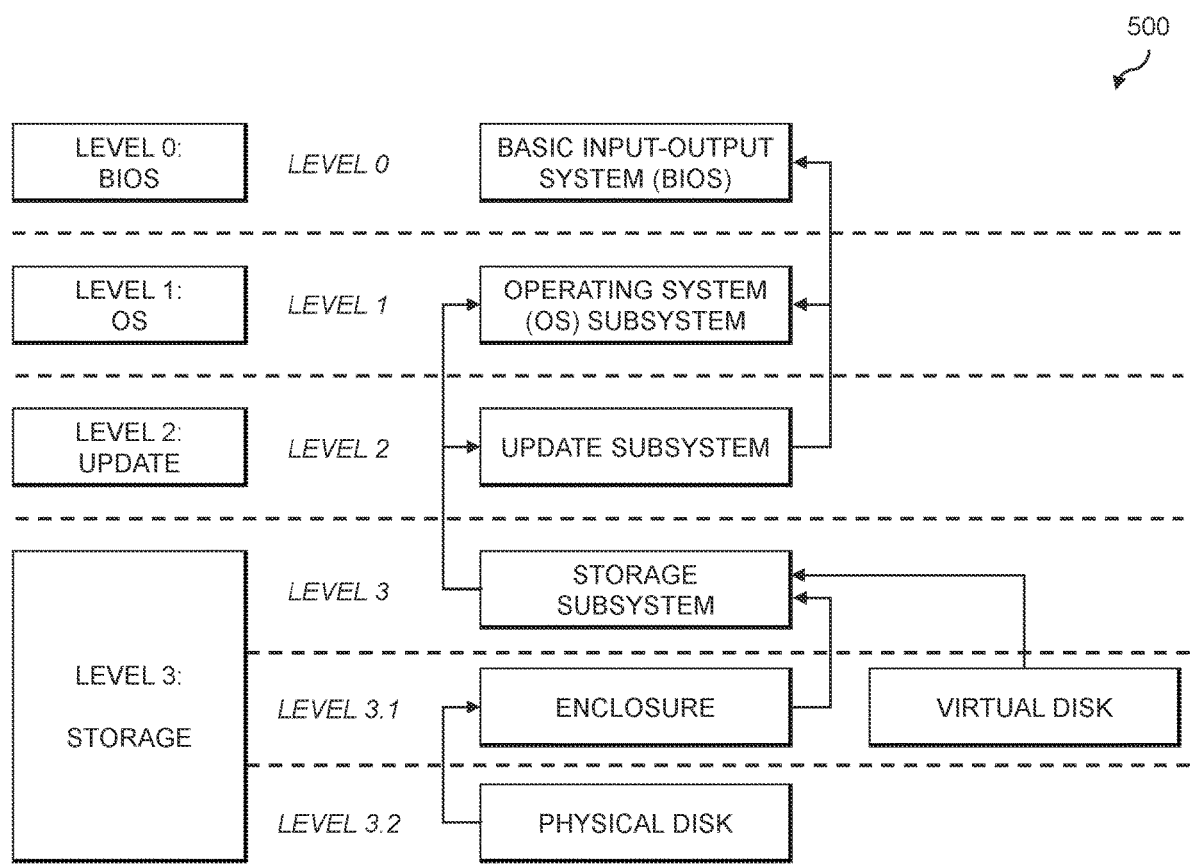
FIG. 5 shows a tree structure for a multi-level console interface for a computing device in an illustrative embodiment.

Once all the subsystems 401 are scanned and their associated details extracted, the console interface state machine builder 403 creates a dependency tree structure where the different subsystems 401 are assigned to the levels 405 corresponding to their positions in the dependency tree. Within a given one of the subsystems 401, different components may be assigned to sub-levels (e.g., which participate in the same screen of the multi-level console interface). FIG. 5 shows a tree structure 500 in which different subsystems are organized into levels and sub-levels. The tree structure 500 includes the BIOS in level 0, an OS subsystem in level 1, an update subsystem in level 2, and a storage subsystem in level 3. Level 3 is further subdivided into sublevels 3.1 and 3.2, where the enclosure and virtual disk components of the storage subsystem are in sublevel 3.1 and the physical disk components of the storage subsystem are in sublevel 3.2.

When generating the multi-level console interface for presentation on a remote access controller of a computing device, a lowest level at which the computing device experiences a "red" (e.g., failure) state is picked, and the multi-level console interface defaults to a screen corresponding to the level of the failure state. This screen will provide links to tools, KB articles, etc. which are associated with the failure state. When the user finishes any required tool work, the console collects the status of the computing device and either stays in the same state (e.g., if it continues to be a red or failure state), or moves to the next level. If there are components in the "yellow" (e.g., warning) state, the screen for the corresponding level may not be presented to the user. The user, however, will be provided with clickable links or other interface features indicating those levels that are not optimal. This allows the user to navigate the multi-level console interface to go to those levels and find the tools allowed for the components in the yellow or warning state. Usually, tools (e.g., a remote access controller admin (RA-CADM) command line utility, a command line interface (CLI), a graphical user interface (GUI), etc.) can be accessed by navigating to the component type and component name to change the state (e.g., RACADM drive, etc.).

A system or computing device may first be categorized into multiple levels based on certain closely-linked objectives. An example objective could be "functional state" where the levels start with the server or computing device in an uninitialized state and continuing until the server or computing deice is functioning as per its deployed design. In some embodiments, the UI for the console is graded into multiple levels denoted L1 through L6, although more or fewer levels may be used as needed or desired. Level L1 corresponds to an uninitialized or corrupted state (e.g., OS not installed, system restore in progress, etc.). Level L2 corresponds to a security vulnerability being discovered (e.g., and a patch available from a file transfer protocol (FTP) site). Level L2 corresponds to the system needing attention (e.g., some hardware failure has happened). Level L4 corresponds to the system deviating from a desired configuration. Level L5 corresponds to the system being within a desired configuration, but being stressed. Level L6 corresponds to the system being within the desired configuration while performing optimally. When the user logs into the console or remote access controller, the user will see the screen relevant to the level associated with the current state of the system. The information useful for that state only will be shown to the user in the most optimal manner, and the objective is for the user to eliminate all issues related to that state. The tools required for that state are prioritized and shown to the user. Multiple levels can coexist, and a user can switch between levels and go to a traditional UI as needed or desired.

Levels may be named (e.g., starting with a level L1), with the criteria and goals of each level being clearly stated and defined. The criteria for a given state define how the system or computing device falls into the given state. The goal for the given state is the objective that an IT administrator or other user is expected to achieve in that level. The criteria and goal may be computed from various scripts or conditions as needed. The system or computing device may maintain a list of impacted subsystems associated with the different levels. These impacted subsystems are those with which the IT administrator or other user will be interacting with and whose results are critical to achieve the goals.

The console may maintain a list of tasks or information elements that are relevant for each level of the multi-level console interface. The task list or information elements may be static in nature (e.g., such as in levels L1 and L2 described below) or dynamic in nature (e.g., such as in levels L3 to L6 described below). The current state and impacted subsystems are analyzed. Based on the current state, the information elements are prioritized. For example, in the L3 state, if the system has issues with one or more power supplies (PSUs) and fans, then those information elements (e.g., PSU health, power metrics, fan health, fan speed dashboard, etc.) are shown. Related tools and commands are also shown (e.g., view PSU details, view PSU logs, modify PSU fields, view fan details, view fan logs, modify fan fields, etc.) to the user. In the case where at least one PSU is in a critical state while one or more fans are in a warning state, then the PSU elements and tasks are shown first followed by the fan elements and tasks. In the case where at least one fan is in a critical state while one or more of the PSUs are in a warning state, then the fan elements and tasks are shown first followed by the PSU elements and tasks. If both are critical/warning, then the PSU elements and tasks may be shown first as issues related to the PSUs may have a bigger impact on the server than issues related to fans. Thus, elements and tasks may be presented in order based on their severity and, if all have the same severity, based on their impact.

The console may constantly compute the level at which the system is currently functioning. This may be done be executing criteria scripts continuously, or by listening to events and changing the current state accordingly. For example, the L1 criteria conditions are executed and even if one of the criteria scripts/conditions returns true, the server is moved to the L1 state. The L1 state may also be achieved if one or more of the events is triggered. It is important that the criteria be set unambiguously to avoid user confusion. It is also possible that the system may be in multiple states. For example, a system may be in the L6 state but, on detecting a security vulnerability, the L2 state is triggered as well. In this scenario, the L2 state will be shown but the user will also see that the L6 state is active and the user can switch to the L6 state screen if needed. When the user logs into the console or remote access controller, the system will show the screens related to the current lowest level of the multi-level hierarchy whose criteria matches the current state of the system. If there are multiple levels whose criteria match the current state of the system (e.g., there are multiple states or levels active), the user can switch between those levels and their associated interface screens (e.g., using "tab" or other defined input). If the user wants to go to a traditional interface, the user can switch there too. The tiered or multi-level console interface enables a user to view the screens that are relevant for the current system state, and to view information required at that level as well as the tools required to move the system into higher levels. Tools are prioritized based on the impact and impacted subsystems. Thus, the user is able to focus on the problems instead of going through a myriad of menus and actions. Further, the screens may get "smaller" or more focused as the system reaches the goal. The screens may get "larger" as the system stays far away from the goal. Thus, IT administrators or other users are able to make an assessment of leftover tasks by looking at the screen size. Like a surgeon, the IT administrators or other users will only see the portions which are needed to restore the system to a desired state, and get the tasks or tools handed to them in a limited sense (e.g., rather than having to search among a myriad of menus and tools).

FIG. 6 shows a table 600 of the different levels L1 through L6 along with their associated criteria, goal, impacted subsystems and tasks. FIG. 7 shows tables 700 and 705 of the criteria set and goal set for level L1, respectively. FIG. 8 shows tables 800 and 805 of the criteria set and goal set for level L2, respectively. FIG. 9 shows tables 900 and 905 of the criteria set and goal set for level L3, respectively. Other criteria and goal states are similarly arrived at based on the criteria given in the table 600.

Goal and criteria set learning will now be described. Levels can by dynamic in nature. In this case, the console scans through message catalogs and, based on various factors (e.g., severity, recommended steps, etc.), assesses the state of the system and assigns them to corresponding levels. In order to do the assessment, the console may try to create a sentiment analysis that involves understanding the impact to the system. The level is determined based on the type of words that are used in the messages, as well as the resolution steps. More messages indicating impact to the overall system, data loss or other critical aspects will be considered as lower levels. More messages indicating localized impact, recoverable impact and which do not need system restarts are considered as higher levels. As a result, when there is a message that is logged into the logs, the system determines the level based on the learning and is intelligent to trigger dynamic communication based on the new error or alerting and should ask the user to follow certain steps (e.g., derived from recommended actions). Additionally, tools may be enhanced by learning from the way different users solve problems differently. For example, some IT administrators may remove, clean and reinsert fans back into the system to resolve fan stoppages or failures. This could be "learned" and added as tools or actions which may be presented to the user via an associated interface screen of a multi-level console interface.

In some embodiments, goal set auto-suspension may be performed using tool intelligence based on user activity. The system may change the tooling based on the user activity. For example, if the user has a meeting scheduled in 5 minutes and a tool takes 15 minutes to execute, then the system could suspend the level and continue with the meeting. This ensures that the user productivity is not impaired. Various approaches may be used to indicate when the user is (or is going to be) busy, and for computing the potential time taken for completing tasks. The technical solutions described herein can use intelligent agents to leverage such information and help to suspend goals to ensure that user productivity is not impaired.

"Gamization" techniques may be used for various application areas. Application screens and dialogs (including installers), for example, may be split into normal and advanced sections. The normal sections contain essential attributes, where the advanced sections contain more customizations. The sections are primarily driven by the user expertise level, and do not have a bearing on the state of the system. The technical solutions described herein base the levels of the console interface on the current state of the system and not necessarily on the level of expertise of the user logged in to the console. For example, at level L5 when configuring redundant array of independent disks (RAID) properties, the console interface may show normal sections (e.g., hot spare and other common attributes) and advanced sections (e.g., where more fine-grained properties like patrol read state can be modified) separately.

Certain OSes have multiple run levels (e.g., "init 0 to 6" in Linux, safe mode, safe mode with network and normal OS in Windows, etc.). While the OS "levels" are meant to provide special environments for the user, the technical solutions described herein provide a "play area" created by the system for the user to drive towards a specific goal. In order to do that, the console selects the tools and information elements which are needed based on the current state of the system, and prioritizes them so that the IT administrator or other user is able to achieve their goals with the least navigational effort. The technical solutions described herein also introduce the notion of criteria and goals which are not used for OS level variants. In some embodiments, the system moves into a specific level automatically based on the current state, while in the case of an OS the user must trigger going to a specific level. In both cases, the user can switch between the levels. The levels, however, cannot be determined by the user. When goals of a level are reached, the system automatically exits that level which is not the case in OS variants as the user can continue to be in that level even if the primary task is complete. The technical solutions described herein also enable modification of the information presented to the user. This may include dynamically updating the outstanding actions that the IT administrator or other user has to do to achieve the goals of a particular level. If the user is able to fix a specific goal element, then all those information elements/tasks would disappear from the screen which is not the case with OS variants.

In some cases, product vendors provide products with different "editions" or versions (e.g., basic, advanced, etc.). These different versions are expected to contain features to perform tasks with growing complexity. The goal for these kinds of products is to be able to create solutions (e.g., scope widens) with increasing complexity. This is equivalent to building a hospital room for any type of surgery. The technical solutions described herein provide a different approach, where the IT administrator or other user that is logged in to a system console is presented with screens of different levels with the goal of bringing the system to the goals that are required for a given level (e.g., scope is limited, like a surgeon performing a specific operation).

Figure 10:
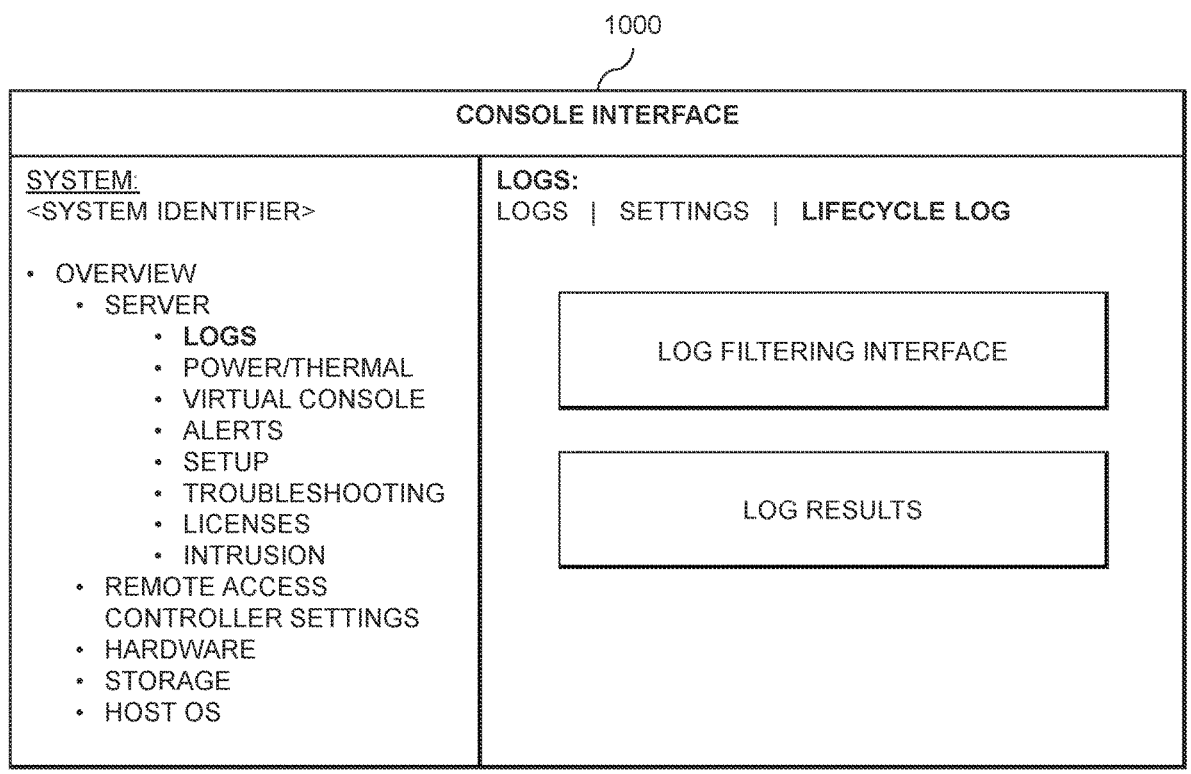
FIG. 10 shows a console interface without a multi-level structure in an illustrative embodiment.

FIG. 10 shows a dashboard view 1000 of a console interface which includes a left pane with a set of drill down menus, of which a particular option "logs" is selected and presented in the right pane. The log view is also further narrowed down to a selected subsection "lifecycle log." FIGS. 11, 12, 13 and 14 show respective screens 1100, 1200, 1300 and 1400 of a multi-level console interface. Each of the screens 1100, 1200, 1300 and 1400 includes, in a top-right corner, model information for the system, along with links allowing a user to logout of the console or select power options (e.g., restart, shut down, etc.). Each of the screens 1100, 1200, 1300 and 1400 also shows, in a bottom-right corner, information regarding an active user logged in to the console and the last login time.

Figure 11:
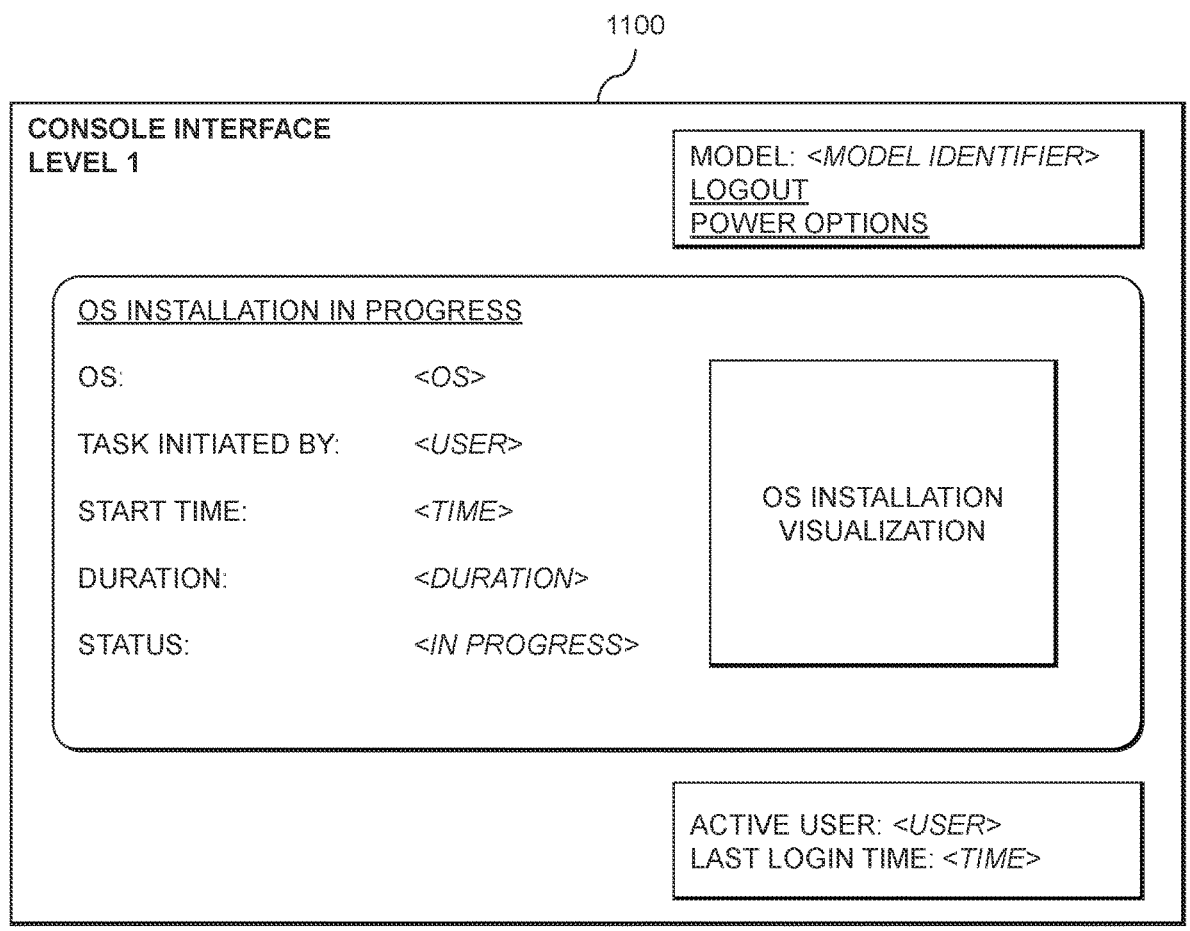
FIG. 11 shows a level of a multi-level console interface for a system in an uninitialized or corrupted state in an illustrative embodiment.

The screen 1100 of FIG. 11 shows a first level of the console interface, indicating that OS installation is in progress, with information such as the OS, the user initiating the task, the start time and duration of the installation, as well as the status. The screen 1100 also has an area to show a visualization of OS installation (e.g., a progress bar, the actual set of screens presented during OS install, etc.).

Figure 12:
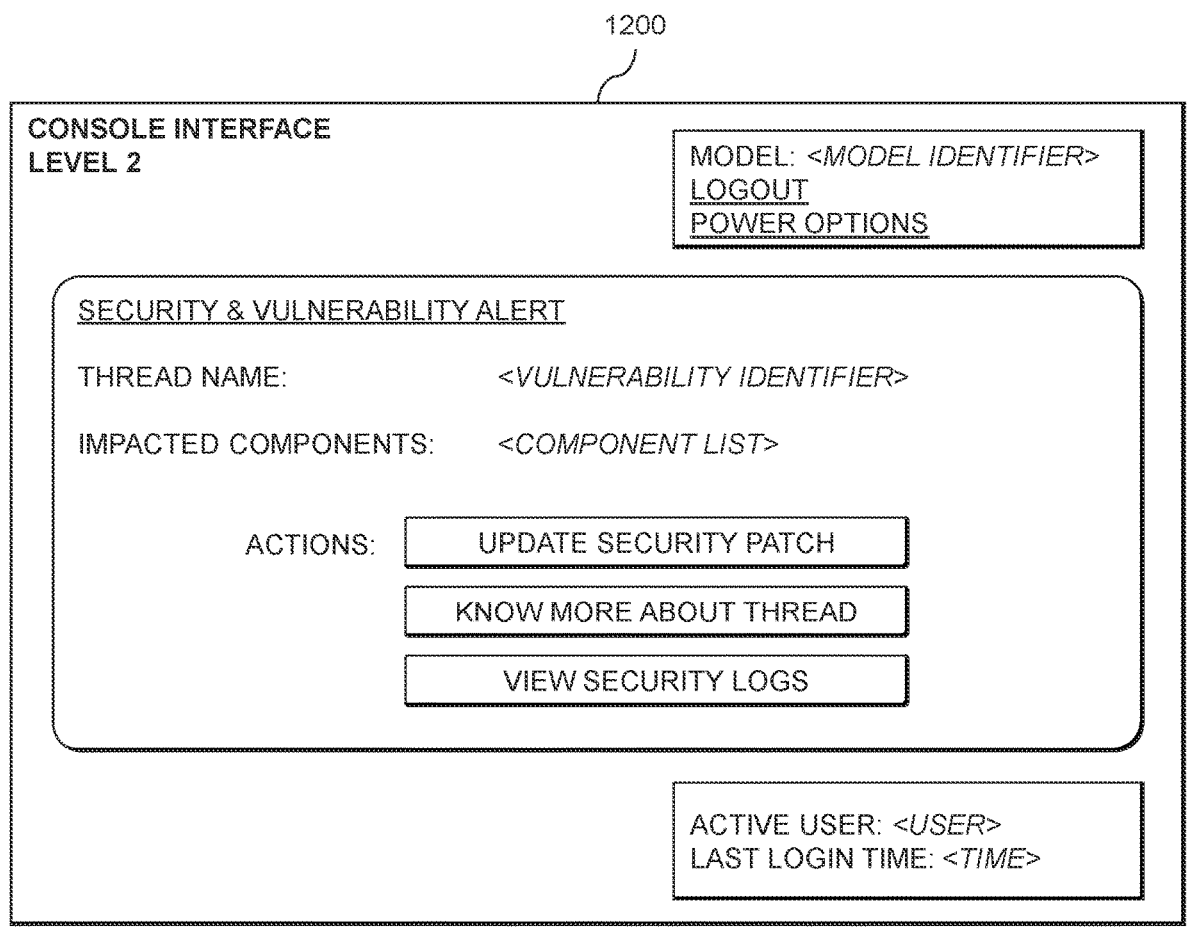
FIG. 12 shows another level of a multi-level console interface for a system with a security vulnerability patch available in an illustrative embodiment.

The screen 1200 of FIG. 12 shows a second level of the console interface, indicating that a security and vulnerability alert is identified, including a thread name and impacted components for the vulnerability. The screen 1200 further shows actions or tools which are presented to the user based on the detected vulnerability, including options for updating a security patch, a link to more information about the detected vulnerability, and a link to view security logs.

Figure 13:
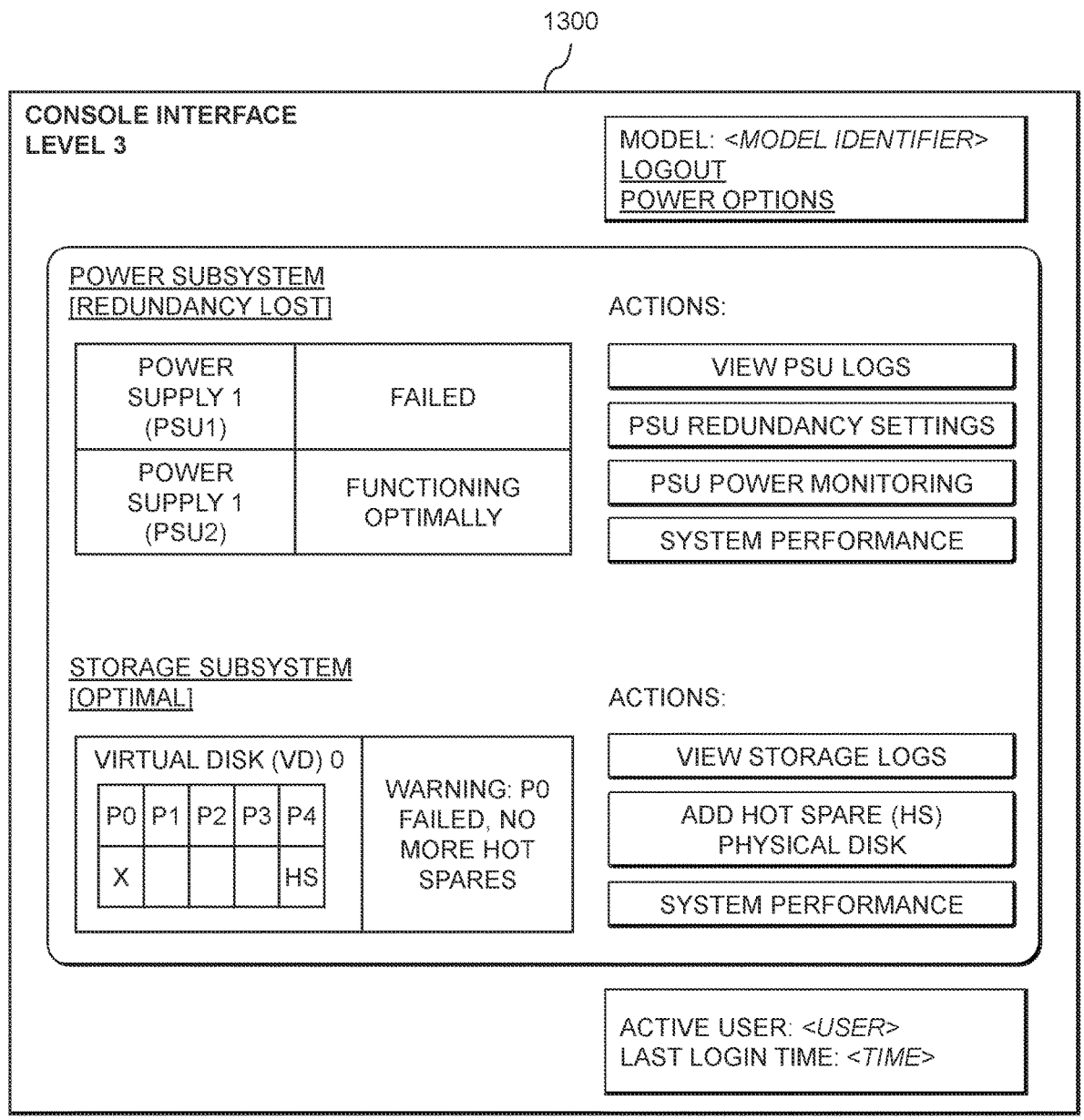
FIG. 13 shows another level of a multi-level console interface for a system that needs attention in an illustrative embodiment.

The screen 1300 of FIG. 13 shows a third level of the console interface, indicating status of power and storage subsystems along with tools or actions presented to the user for taking actions relating to the power and storage subsystems. The power subsystem is presented first, as it is in a redundancy lost condition, while the storage subsystem is in an optimal condition. The power subsystem here includes two PSUs, with one being failed and the other functioning optimally. The power subsystem actions include viewing PSU logs, configuring PSU redundancy settings, viewing PSU power monitoring information, and viewing system performance information. The storage subsystem includes a virtual disk with one failed physical disk (P0) and no more hot spares (HS). The storage subsystem actions include viewing storage logs, adding a HS physical disk, and viewing system performance information.

Figure 14:
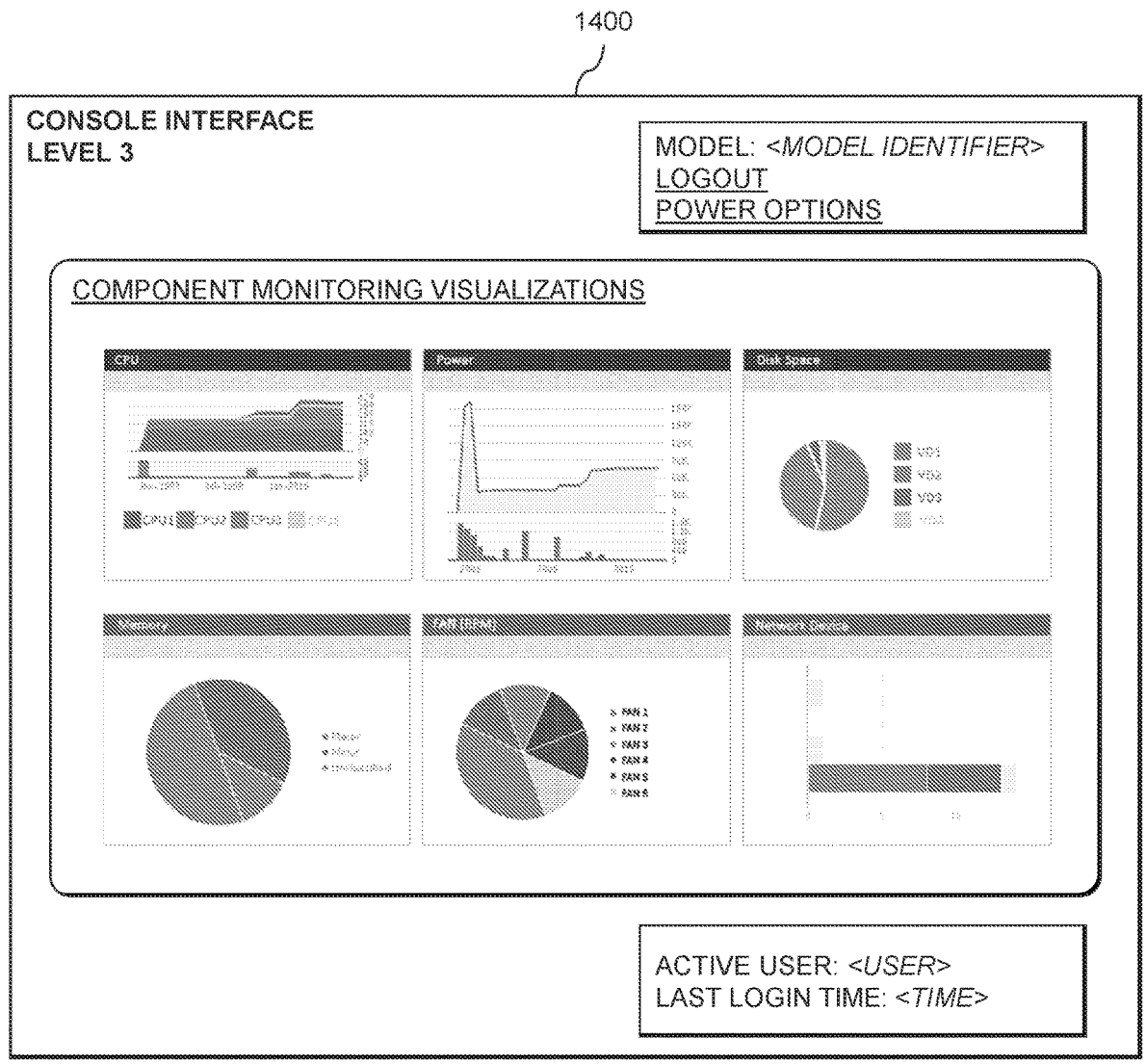
FIG. 14 shows another level of a multi-level console interface for a system in a desired state in an illustrative embodiment.

The screen 1400 of FIG. 14 shows a sixth level of the console interface, which shows various component monitoring visualizations for the system. Here, such visualizations include CPU monitoring, power monitoring, disk space, memory, fan rotations per minute (RPM) and network device bandwidth visualizations.

Illustrative embodiments leverage video gaming concepts to simplify the user interface of system consoles. Advantageously, the technical solutions described herein generate and present a particular interface screen for a level of a multi-level console interface based on the current state of the system (e.g., not necessarily a level of expertise of the user). The technical solutions described herein also utilize goal set criteria which are determined based on the impact to the system, and introduce a level of urgency to the user. The goal set criteria enables the user to know exactly what needs to be acted on at the right time. The goal set criteria is also used to hand tools to the user where needed (e.g., like tools handed to surgeons), which improves the response time and enables the user to make the right decisions.

Goal and criteria set learning in some embodiments uses a new type of sentiment analysis that allows systems to determine the severity level of the system based on keywords that help determine the impact to the system. This is achieved by scanning the various contents of message catalogs to identify knowledge-aware sentiment keywords that determine impact to the system. For example, if a patch update has been released and it requires immediate attention, the console will block the user activity (e.g., indicating that there would be impact on upcoming work and it would be better to update the system now). The technical solutions described herein also leverage knowledge of the time required to complete tasks and user availability to determine and suspend the goal set criteria so that user activity is not impaired. Advantageously, the technical solutions provide a multi-level console interface with a simplified user interface that provides console screens which are simplified to essential elements and enables IT administrators or other users to be able to solve their problems much faster.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for generating multi-level console interfaces for computing devices will now be described in greater detail with reference to FIGS. 15 and 16. Although described in the context of information processing system 100, these platforms may also be used to implement at least portions of other information processing systems in other embodiments.

Figure 15:
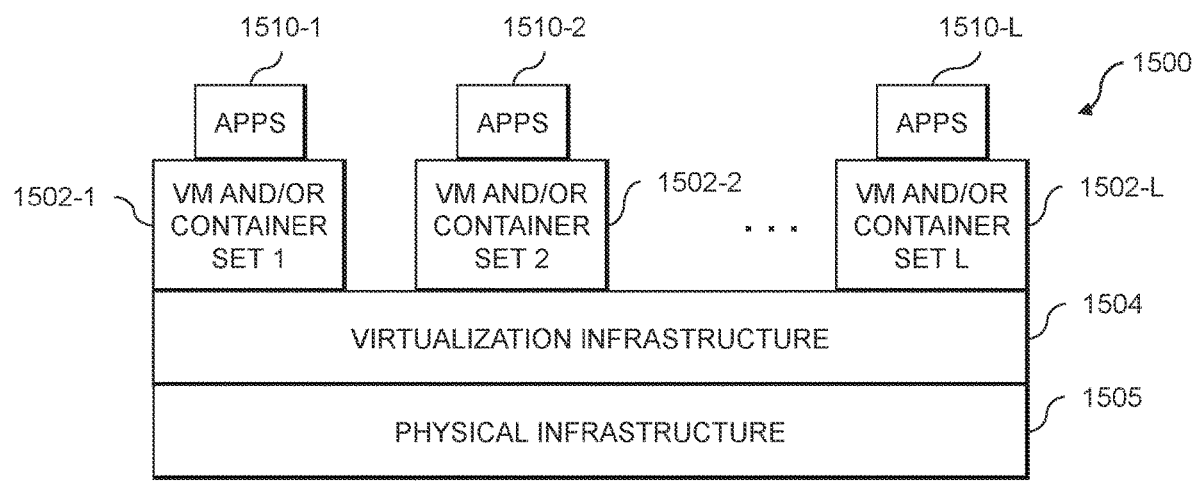
FIGS. 15 and 16 show examples of processing platforms that may be utilized to implement at least a portion of an information processing system in illustrative embodiments.
Figure 16:
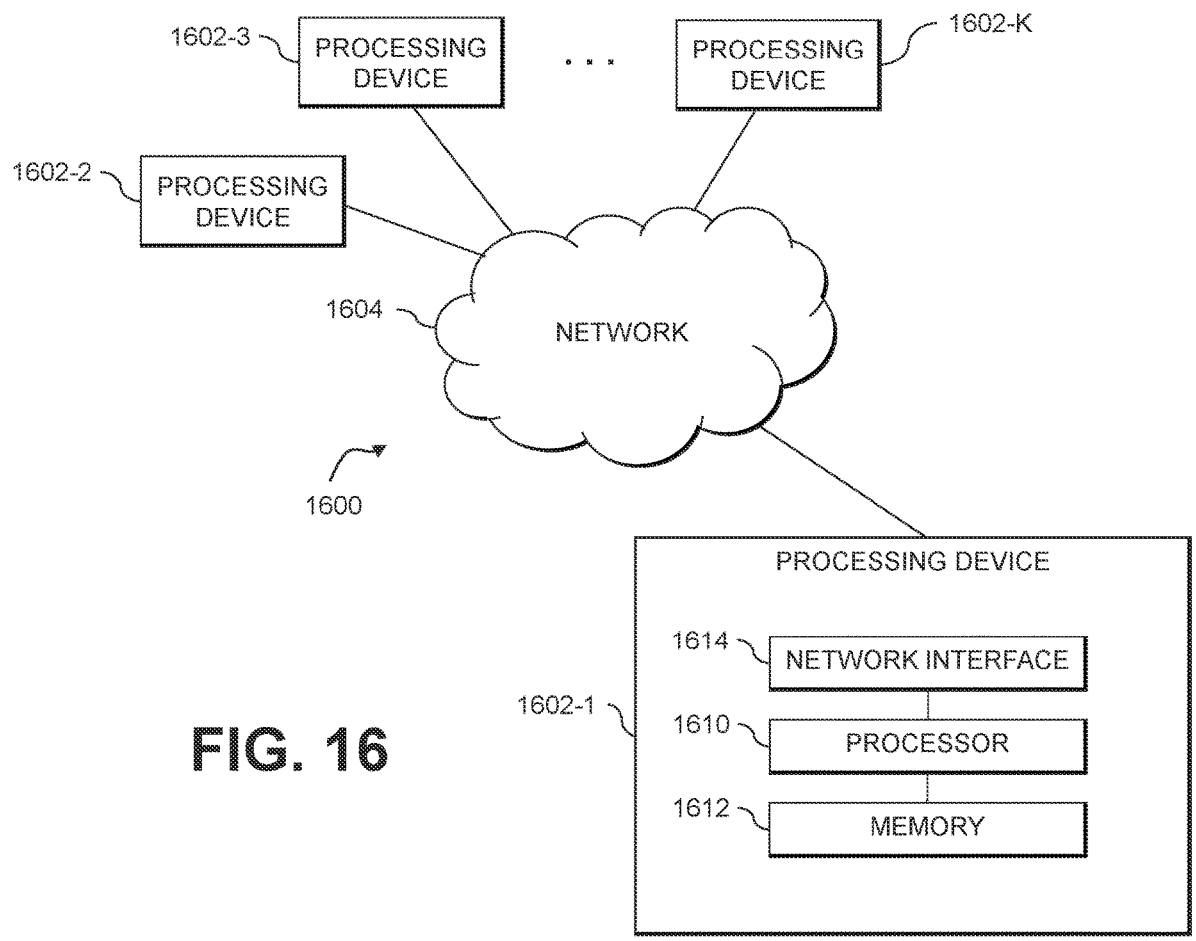

FIG. 15 shows an example processing platform comprising cloud infrastructure 1500. The cloud infrastructure 1500 comprises a combination of physical and virtual processing resources that may be utilized to implement at least a portion of the information processing system 100 in FIG. 1. The cloud infrastructure 1500 comprises multiple virtual machines (VMs) and/or container sets 1502-1, 1502-2, . . . 1502-L implemented using virtualization infrastructure 1504. The virtualization infrastructure 1504 runs on physical infrastructure 1505, and illustratively comprises one or more hypervisors and/or operating system level virtualization infrastructure. The operating system level virtualization infrastructure illustratively comprises kernel control groups of a Linux operating system or other type of operating system.

The cloud infrastructure 1500 further comprises sets of applications 1510-1, 1510-2, . . . 1510-L running on respective ones of the VMs/container sets 1502-1, 1502-2, . . . 1502-L under the control of the virtualization infrastructure 1504. The VMs/container sets 1502 may comprise respective VMs, respective sets of one or more containers, or respective sets of one or more containers running in VMs.

In some implementations of the FIG. 15 embodiment, the VMs/container sets 1502 comprise respective VMs implemented using virtualization infrastructure 1504 that comprises at least one hypervisor. A hypervisor platform may be used to implement a hypervisor within the virtualization infrastructure 1504, where the hypervisor platform has an associated virtual infrastructure management system. The underlying physical machines may comprise one or more distributed processing platforms that include one or more storage systems.

In other implementations of the FIG. 15 embodiment, the VMs/container sets 1502 comprise respective containers implemented using virtualization infrastructure 1504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system 100 may each run on a computer, server, storage device or other processing platform element. A given such element may be viewed as an example of what is more generally referred to herein as a "processing device." The cloud infrastructure 1500 shown in FIG. 15 may represent at least a portion of one processing platform. Another example of such a processing platform is processing platform 1600 shown in FIG. 16.

The processing platform 1600 in this embodiment comprises a portion of information processing system 100 and includes a plurality of processing devices, denoted 1602-1, 1602-2, 1602-3, . . . 1602-K, which communicate with one another over a network 1604.

The network 1604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1602-1 in the processing platform 1600 comprises a processor 1610 coupled to a memory 1612.

The processor 1610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1612 may comprise random access memory (RAM), read-only memory (ROM), flash memory or other types of memory, in any combination. The memory 1612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1602-1 is network interface circuitry 1614, which is used to interface the processing device with the network 1604 and other system components, and may comprise conventional transceivers.

The other processing devices 1602 of the processing platform 1600 are assumed to be configured in a manner similar to that shown for processing device 1602-1 in the figure.

Again, the particular processing platform 1600 shown in the figure is presented by way of example only, and information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for generating multi-level console interfaces for computing devices as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, computing devices, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured:
        to detect a user login to access a console of a computing device, the console implementing a multi-level console interface comprising two or more levels, each of the two or more levels being associated with a set of criteria, one or more goals to be achieved, and one or more actions relevant for achieving the one or more goals;
        to determine a current state of the computing device;
        to select a given level of the multi-level console interface, the given level of the multi-level console interface being selected based at least in part on mapping the current state of the computing device with a given set of criteria associated with the given level of the multi-level console interface; and
        to provide, via the console of the computing device, an interface screen corresponding to the given level of the multi-level console interface, the interface screen displaying the one or more actions relevant for achieving the one or more goals of the given level of the multi-level console interface to facilitate transitioning of the computing device from the current state to a desired state.

2. The apparatus of claim 1 wherein the console of the computing device comprises a remote access controller permitting remote network-based access to the console of the computing device.

3. The apparatus of claim 1 wherein the two or more levels of the multi-level console interface are arranged in a hierarchy of subsystems of the computing device.

4. The apparatus of claim 3 wherein the one or more goals of each level comprise advancing the computing device from the current state corresponding to a current level of the hierarchy to another state corresponding to a higher level of the hierarchy.

5. The apparatus of claim 4 wherein the given level comprises a lowest level of the hierarchy having a set of criteria mapped to the current state of the computing device.

6. The apparatus of claim 3 wherein the hierarchy comprises:
    a first level corresponding to a basic input-output system of the computing device;
    a second level corresponding to an operating system of the computing device; and
    a third level corresponding to an update subsystem of the computing device.

7. The apparatus of claim 1 wherein determining the current state of the computing device comprises performing a sentiment analysis of messages from one or more message catalogs of the computing device to determine knowledge-aware sentiment keywords mapped to the set of criteria for different ones of the two or more levels.

8. The apparatus of claim 1 wherein providing the interface screen corresponding to the given level of the multi-level console interface comprises:
   determining one or more upcoming scheduled tasks for the user logged in to the console of the computing device;
   determining a time required for performing the one or more actions of the given level of the multi-level console interface; and
   displaying a subset of the one or more actions of the given level of the multi-level console interface which are able to be completed prior to the one or more upcoming scheduled tasks for the user logged in to the console of the computing device.

9. The apparatus of claim 1 wherein the at least one processing device is also configured to build the multi-level console interface by utilizing a state machine builder to scan and extract information from two or more subsystems of the computing device and to assign respective ones of the two or more subsystems of the computing device to different ones of the two or more levels.

10. The apparatus of claim 9 wherein the state machine builder is configured to generate a dependency tree structure of the two or more subsystems of the computing device, the two or more subsystems comprising a basic input-output system associated with a first one of the two or more levels, an operating system associated with a second one of the two or more levels, and an update subsystem associated with a third one of the two or more levels, the second and third levels having dependencies with the first level, and the third level having a dependency with the second level.

11. The apparatus of claim 1 wherein the given level corresponds to the computing device being in at least one of an uninitialized and a corrupted state, a given set of criteria of the given level comprising at least one of determining that the computing device does not have an operating system installed, determining that a system restore is in progress for the computing device, determining that an operating system of the computing device has crashed, and determining that the computing device is corrupted.

12. The apparatus of claim 1 wherein the given level corresponds to the computing device having one or more security updates available, a given set of criteria of the given level comprising determining that one or more update sources have one or more updates with at least a designated threshold urgency.

13. The apparatus of claim 1 where the given level corresponds to the computing device needing attention, a given set of criteria of the given level comprising determining that one or more components of the computing device is in a critical state.

14. The apparatus of claim 1 wherein the given level comprises one of:
   a first level corresponding to the computing device deviating from the desired state, a first set of criteria of the first level comprising determining that a configuration state of the computing device deviates at least a designated threshold amount from the desired state;
   a second level corresponding to the computing device being in the desired state but stressed, a second set of criteria of the second level comprising determining that performance metrics for one or more components of the computing device are outside a designated performance range; and
   a third level corresponding to the computing device being in the desired state and unstressed, a third set of criteria of the third level comprising determining that the performance metrics for the one or more components of the computing device are within the designated performance range.

15. A computer program product comprising a non-transitory processor-readable storage medium having stored therein program code of one or more software programs, wherein the program code when executed by at least one processing device causes the at least one processing device:
   to detect a user login to access a console of a computing device, the console implementing a multi-level console interface comprising two or more levels, each of the two or more levels being associated with a set of criteria, one or more goals to be achieved, and one or more actions relevant for achieving the one or more goals;
   to determine a current state of the computing device;
   to select a given level of the multi-level console interface, the given level of the multi-level console interface being selected based at least in part on mapping the current state of the computing device to a given set of criteria associated with the given level of the multi-level console interface; and
   to provide, via the console of the computing device, an interface screen corresponding to the given level of the multi-level console interface, the interface screen displaying the one or more actions relevant for achieving the one or more goals of the given level of the multi-level console interface to facilitate transitioning of the computing device from the current state to a desired state.

16. The computer program product of claim 15 wherein the console of the computing device comprises a remote access controller permitting remote network-based access to the console of the computing device.

17. The computer program product of claim 15 wherein the two or more levels of the multi-level console interface are arranged in a hierarchy of subsystems of the computing device, wherein the one or more goals of each level comprise advancing the computing device from the current state corresponding to a current level of the hierarchy to another state corresponding to a higher level of the hierarchy, and wherein the given level comprises a lowest level of the hierarchy having a set of criteria mapped to the current state of the computing device.

18. A method comprising:
   detecting a user login to access a console of a computing device, the console implementing a multi-level console interface comprising two or more levels, each of the two or more levels being associated with a set of criteria, one or more goals to be achieved, and one or more actions relevant for achieving the one or more goals;
   determining a current state of the computing device;
   selecting a given level of the multi-level console interface, the given level of the multi-level console interface being selected based at least in part on mapping the current state of the computing device to a given set of criteria associated with the given level of the multi-level console interface; and
   providing, via the console of the computing device, an interface screen corresponding to the given level of the multi-level console interface, the interface screen displaying the one or more actions relevant for achieving the one or more goals of the given level of the multi-level console interface to facilitate transitioning of the computing device from the current state to a desired state;

wherein the method is performed by at least one processing device comprising a processor coupled to a memory.

19. The method of claim 18 wherein the console of the computing device comprises a remote access controller permitting remote network-based access to the console of the computing device.

20. The method of claim 18 wherein the two or more levels of the multi-level console interface are arranged in a hierarchy of subsystems of the computing device, wherein the one or more goals of each level comprise advancing the computing device from the current state corresponding to a current level of the hierarchy to another state corresponding to a higher level of the hierarchy, and wherein the given level comprises a lowest level of the hierarchy having a set of criteria mapped to the current state of the computing device.

* * * * *